United States Patent
Grudzinski et al.

(10) Patent No.: US 8,650,802 B2
(45) Date of Patent: Feb. 18, 2014

(54) VEHICLE (AUTOMOBILE) FLUSH GLASS APPEARANCE ASSEMBLY

(75) Inventors: Gregory James Grudzinski, Perrysburg, OH (US); Chester Stanislaus Walawender, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 6 days.

(21) Appl. No.: 13/227,507

(22) Filed: Sep. 8, 2011

(65) Prior Publication Data

US 2013/0061529 A1 Mar. 14, 2013

(51) Int. Cl.
*E05D 15/16* (2006.01)

(52) U.S. Cl.
USPC .............................................. 49/502; 49/441

(58) Field of Classification Search
USPC ............ 49/440–444, 502; 296/146.15, 146.2, 296/146.3, 201
See application file for complete search history.

(56) References Cited

U.S. PATENT DOCUMENTS

| | | | |
|---|---|---|---|
| 4,240,227 A | 12/1980 | Hasler et al. | |
| 4,370,832 A | 2/1983 | Koike | |
| 4,457,111 A | 7/1984 | Koike | |
| 4,483,100 A * | 11/1984 | Blankenburg et al. | 49/352 |
| 4,490,942 A * | 1/1985 | Arnheim et al. | 49/374 |
| 4,509,293 A * | 4/1985 | Ufrecht et al. | 49/502 |
| 4,571,886 A | 2/1986 | Shiraishi | |
| 4,608,779 A | 9/1986 | Maeda et al. | |
| 4,616,446 A | 10/1986 | Okamoto | |
| 4,621,453 A | 11/1986 | Watanabe et al. | |
| 4,631,865 A * | 12/1986 | Motonami et al. | 49/374 |
| 4,633,613 A * | 1/1987 | Kobayashi et al. | 49/227 |
| 4,653,230 A | 3/1987 | Seo et al. | |
| 4,662,113 A | 5/1987 | Weaver | |
| 4,689,916 A | 9/1987 | Shimizu | |
| 4,691,476 A | 9/1987 | Yao et al. | |
| 4,697,386 A | 10/1987 | Watanabe et al. | |
| 4,731,951 A | 3/1988 | Ikuta et al. | |
| 4,762,481 A | 8/1988 | Weaver | |

(Continued)

FOREIGN PATENT DOCUMENTS

DE 3236168 A1 4/1984
EP 0340483 A2 11/1989

(Continued)

OTHER PUBLICATIONS

U.S. Appl. No. 13/227,514, filed Sep. 8, 2011, entitled "Flush Glass Assembly Interfaces," specification and drawings (28 pages) and filing receipt (3 pages).

(Continued)

*Primary Examiner* — Katherine Mitchell
*Assistant Examiner* — Abe Massad
(74) *Attorney, Agent, or Firm* — Raymond Coppiellie; Price Heneveld LLP

(57) ABSTRACT

An automobile flush glass assembly is provided that includes a moveable glass piece having an inboard surface, a front edge and a rear edge and a first glass guide operably connected to the inboard surface of the glass piece proximate the front edge. The assembly also includes a second glass guide operably connected to the inboard surface of the glass piece proximate the rear edge and retaining structures, each having a channel configured to slideably retain the glass guides.

18 Claims, 9 Drawing Sheets

(56) References Cited

U.S. PATENT DOCUMENTS

| | | | |
|---|---|---|---|
| 4,823,511 A | 4/1989 | Herliczek et al. | |
| 4,834,931 A | 5/1989 | Weaver | |
| 4,842,327 A | 6/1989 | Hennessy | |
| 4,858,988 A | 8/1989 | Morgan et al. | |
| 4,874,201 A | 10/1989 | Scaglietti | |
| 4,875,307 A | 10/1989 | Barbero | |
| 4,932,161 A | 6/1990 | Keys et al. | |
| 4,932,712 A * | 6/1990 | Tomforde | 296/146.9 |
| 4,970,828 A | 11/1990 | Mesnel et al. | |
| 4,984,389 A * | 1/1991 | Benoit et al. | 49/502 |
| 4,988,142 A | 1/1991 | Chandler et al. | |
| 4,999,951 A | 3/1991 | Keys et al. | |
| 5,040,333 A | 8/1991 | Mesnel et al. | |
| 5,054,242 A * | 10/1991 | Keys et al. | 49/490.1 |
| 5,086,589 A | 2/1992 | dibenedetto | |
| 5,154,028 A | 10/1992 | Hill et al. | |
| 5,261,721 A | 11/1993 | Conger et al. | |
| 5,613,325 A | 3/1997 | Mariel | |
| 5,732,509 A | 3/1998 | Buehler et al. | |
| 6,152,523 A | 11/2000 | Schonebeck | |
| 6,220,650 B1 | 4/2001 | Davis et al. | |
| 6,299,235 B1 | 10/2001 | Davis et al. | |
| 6,394,529 B2 | 5/2002 | Davis et al. | |
| 6,464,293 B2 | 10/2002 | Nozaki | |
| 6,572,176 B2 | 6/2003 | Davis et al. | |
| 6,643,984 B2 | 11/2003 | Kato et al. | |
| 6,729,674 B2 | 5/2004 | Davis et al. | |
| 6,826,876 B2 | 12/2004 | Brandner | |
| 6,880,293 B2 * | 4/2005 | Ishikawa et al. | 49/414 |
| 7,172,239 B2 * | 2/2007 | Nozaki et al. | 296/146.9 |
| 7,360,826 B2 | 4/2008 | Nakagawa et al. | |
| 7,581,779 B2 * | 9/2009 | Baumgart et al. | 296/146.5 |
| 7,753,434 B2 | 7/2010 | MacPhail-Fausey | |
| 2005/0229496 A1 * | 10/2005 | Tashima et al. | 49/441 |
| 2006/0021282 A1 * | 2/2006 | Tamaoki et al. | 49/441 |
| 2008/0224501 A1 | 9/2008 | Zimmer et al. | |
| 2009/0001755 A1 | 1/2009 | Fuetterer | |
| 2009/0113802 A1 | 5/2009 | Cicala | |

FOREIGN PATENT DOCUMENTS

| | | |
|---|---|---|
| EP | 0355948 A2 | 2/1990 |
| JP | 60206720 A | 10/1985 |
| JP | 6164531 A | 4/1986 |
| JP | 4135989 A | 5/1992 |
| JP | 4278826 A | 10/1992 |

OTHER PUBLICATIONS

U.S. Appl. No. 13/227,521, filed Sep. 8, 2011, entitled "Method for Assembling Flush Glass Assembly," specification and drawings (28 pages) and filing receipt (3 pages).

U.S. Appl. No. 13/227,547, filed Sep. 8, 2011, entitled "Lower Door Structure for Flush Glass System," specification and drawings (28 pages) and filing receipt (3 pages).

* cited by examiner

US 8,650,802 B2

VEHICLE (AUTOMOBILE) FLUSH GLASS APPEARANCE ASSEMBLY

FIELD OF THE INVENTION

The present invention generally relates to automobile glass guiding and sealing systems, and more particularly to such systems having a flush body/glass appearance.

BACKGROUND OF THE PRESENT INVENTION

Generally, automotive glass window systems include one or more windows that are moveable in a substantially vertical direction. In order to improve both the aerodynamic and aesthetic characteristics of a vehicle, attempts have been made to eliminate the inboard offset of such glass windows. Complete elimination of the offset is known as pursuing a substantially "flush" relationship between the glass windows with the adjacent body and trim surfaces.

Previous attempts to obtain such a flush relationship have been stymied by inadequate guiding and sealing systems that allow the glass window to remain stable during the substantially vertical motion. Inadequate guiding and sealing systems cause the glass window to be prone to chucking while driving on rough road and binding during typical glass function cycling. Additional problems include glass "blow-out" due to wind flow vortex around the glass that causes a pressure differential and sucking of the glass outboard and away from the guiding and sealing system.

Accordingly, a vehicle flush glass design is desired having the aforementioned advantages and solving and/or making improvements on the aforementioned disadvantages.

SUMMARY OF THE PRESENT INVENTION

In one disclosed aspect of the invention, an automobile flush glass assembly is provided that includes a moveable glass piece having an inboard surface, a front edge and a rear edge and a first glass guide operably connected to the inboard surface of the glass piece proximate the front edge. The assembly also includes a second glass guide operably connected to the inboard surface of the glass piece proximate the rear edge and retaining structures, each having a channel configured to slideably retain the glass guides.

In another disclosed aspect of the invention, a glass guiding and stabilization system for an automobile is provided. The system includes a glass piece located proximate a door of the automobile, wherein the glass piece comprises an outboard surface, an inboard surface, a front edge and a rear edge, and wherein the door is rotatable between an opened position and a closed position. The system further includes a glass guide having an operable connection to the inboard surface of the glass piece, a retaining structure having a channel that includes a seal, wherein the retaining structure is mechanically fastened to an inner panel of the door, and wherein the glass piece front edge is adjacent a first object and the rear edge is adjacent a second object and the outboard surface of the glass piece is in a single plane with the first and second objects when the door is in the closed position.

In a further disclosed aspect of the invention, a glass guiding and stabilization system for an automobile is provided. The system includes a moveable glass piece having an outboard surface and an inboard surface and a glass guide having an operable connection to the inboard surface of the moveable glass piece. The system further includes an appliqué having a channel, wherein the channel includes a seal having a low friction coating or other known material that is configured to slideably retain the glass guide and a rigid insert for structural strengthening of the appliqué.

These and other aspects, objects, and features of the present invention will be understood and appreciated by those skilled in the art upon studying the following specification, claims, and appended drawings.

DETAILED DESCRIPTION OF EMBODIMENTS

As required, detailed embodiment(s) of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
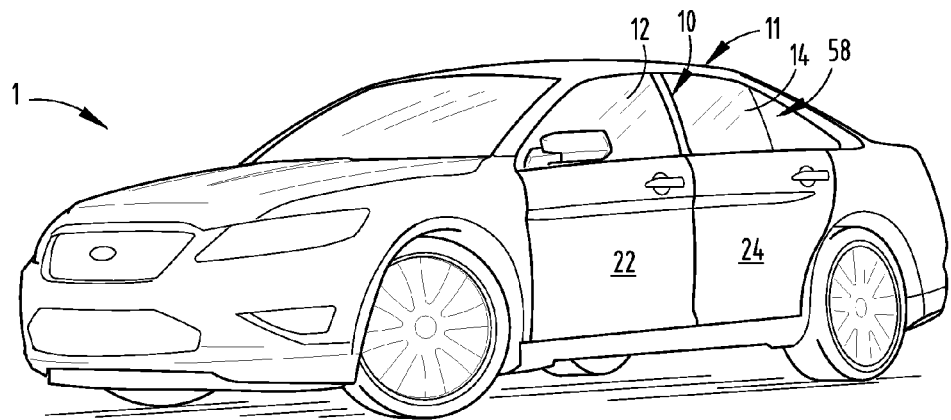
FIG. 1 is a front perspective view of a first embodiment of an automobile having a flush glass assembly.

For purposes of description herein, the terms "upper," "lower," right," "left," "rear," "front," "vertical," "horizontal," and derivatives thereof shall relate to the present invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
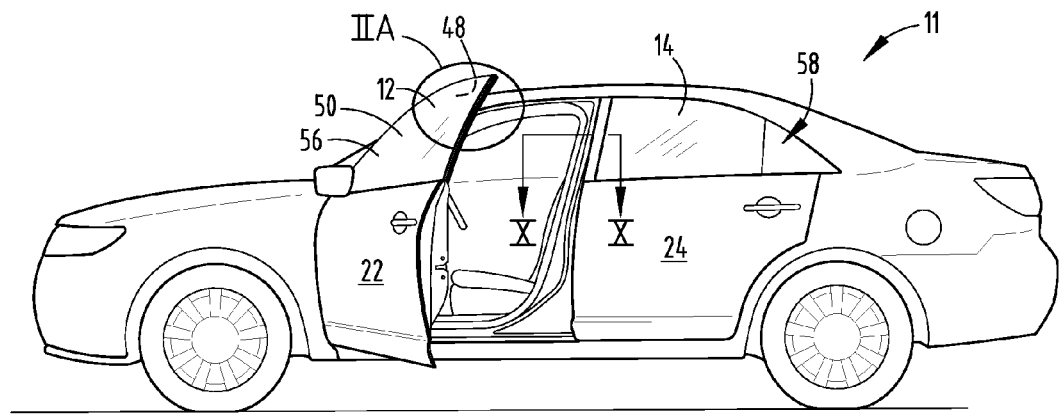
FIG. 2 is an elevated side view of the automobile with a front side door in an open position.
Figure 2A:
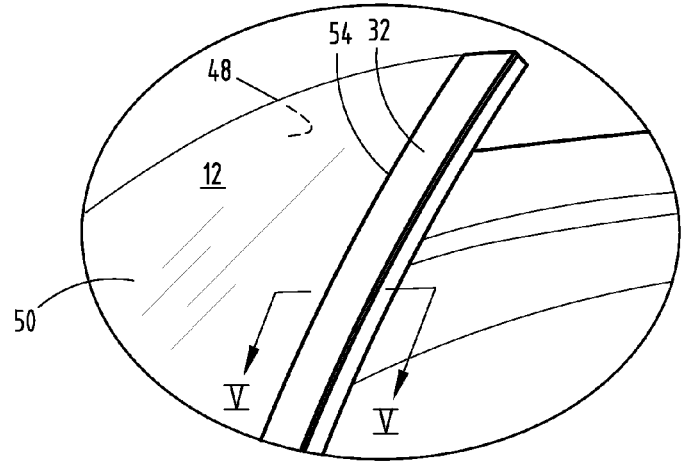
FIG. 2A is an enlarged view of section IIA in FIG. 2 showing the top and rear side of a glass window.
Figure 3:
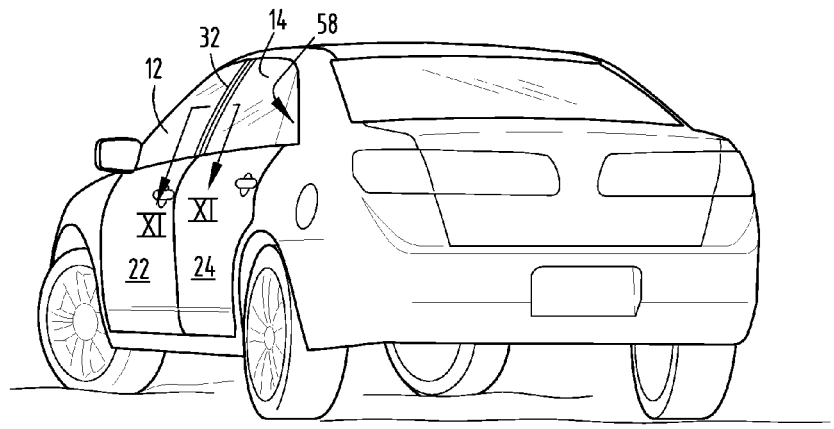
FIG. 3 is a rear perspective view of the automobile.

Referring now to FIGS. 1-3, reference numeral 1 generally designates an automobile (automotive vehicle) flush glass assembly 11 having a glass guiding and stabilization system 10. In the illustrated example, the assembly 11 comprises a first glass piece 12, a second glass piece 14, and a quarter glass piece 58, where each glass piece 12, 14, 58 includes an inboard surface 48, an outboard surface 50, a front edge 56, and a rear edge 54. Each glass piece 12, 14, 58 may be moveable or fixed. One or all of the glass pieces 12, 14, 58 may be door window panes (panels) that, when moveable, may be actuated or manually actuated. The movement of the glass pieces 12, 14, 58 is in a substantially vertical direction and closes out a daylight opening of the vehicle. However, with the use of the glass guiding and stabilization system 10, the first glass piece 12, the second glass piece 14, and/or a quarter glass piece 58 may be articulated or rotated into a drop position. The first and second glass pieces 12, 14 are each operably connected to a first and second door 22, 24, respectively, where each glass piece 12, 14 rotates in conjunction with the first and second doors 22, 24, respectively, about door hinges. The quarter glass piece 58 is operably connected to the second door 24. The operable connection of the glass pieces 12, 14, 58 to the first and second door 22, 24 will be described in detail below. Each glass piece 12, 14, 58 may be constructed of any glass type suited for automobile application. Examples include tempered, laminated, acoustic laminated, ion exchange thin glass, and may include privacy tinting. The glass guiding and stabilization system 10 provides for a flush glass assembly 11 in which the glass pieces 12, 14, 58 are in a single plane with outer surfaces of various adjacent vehicle doors and body components.

Figure 4:
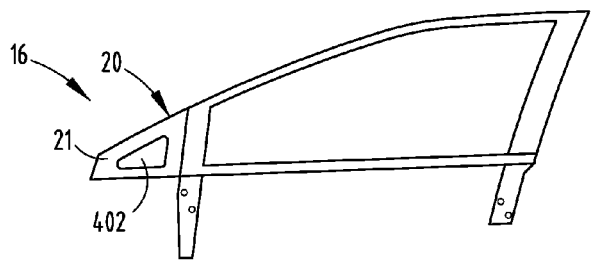
FIG. 4 is a side view of a daylight opening module that is employed in a vehicle side door.

Located adjacent the front edge 56 (FIG. 4) of the first glass piece 12 is a first object 20 that includes an outboard surface 21. The first object 20 may comprise a number of automotive components including, but not limited to, a mirror sail cover, a trim appliqué, belts, interior or exterior trim, badging, etc. The first object 20 may be an individual component or may be part of an integrated, single-unit daylight opening module 16, which will be described in detail below. The flush glass assembly 11 may include more than one daylight opening module 16, typically dependent on the number of doors presents, or in other words, the number of daylight openings being integrated into the flush appearance, but this will ultimately depend upon the suitable number for the particular application. Located adjacent the rear edge 54 of the first glass piece 12 is a second object (not labeled). The second object may comprise a number of automotive components, including the second glass piece 14. Additionally, the second object that is located immediately adjacent the rear edge 54 of the first glass piece 12 may comprise a buffer between the first glass piece 12 and the second glass piece 14. The buffer may be mounted to one or both of the doors 22, 24, the automobile body side, or the daylight opening module 16. Such a buffer may take the form of a number of components including, but not limited to, an appliqué 32 or simply a sealing component residing between the first glass piece 12 and the second glass piece 14. Irrespective of what the second object comprises, the second object includes an outboard surface, as is the case with the first glass piece 12, the second glass piece 14, and the first object 20. When the first and second doors 22, 24 are in a closed position and the first and second glass pieces 12, 14 are in a raised position (if moveable), the outboard surfaces 50, 21 of the glass pieces 12, 14, the first object 20, and the second object are all in a single plane, giving all of these components 12, 14, 20, 32, a flush appearance. One or more of the outboard surfaces 50, 21 may be tuned to have an over flush appearance to adjust for wind noise performance. This may also be true for the quarter glass piece 58. Additionally, the automobile header may be flush with the components.

Similar to the first glass piece 12, the second glass piece 14 has objects located immediately adjacent the front edge 56 and the rear edge 54. Immediately adjacent the front edge 56 of the second glass piece 14 is either the first glass piece 12 or the buffer between the first and second glass pieces 12, 14, as described above. As noted above, the buffer may take the form of several alternative components and may be mounted to one or both of the doors 22, 24, the body side of the automobile body side, or the daylight opening module 16. To reiterate, the buffer may be an appliqué 32 or a seal of various embodiments. Such various sealing embodiments are illustrated in FIGS. 16-18A. The seals may be made of various materials, including thermoplastic vulcanizates (TPVs), thermoplastic polyurethanes (TPUs), thermoplastic polyolefins (TPOs), ethylene propylene diene monomers (EPDMs), etc. Located immediately adjacent the rear edge 54 of the second glass piece 14 is one of various components, including but not limited to, the fixed glass piece 58 or a buffer between the second glass piece 14 and the fixed glass piece 58. As is the case between the first and second glass pieces 12, 14, the buffer may be a channel, an appliqué and/or a sealing component. Continuing the flush appearance of the vehicle, an outboard surface 60 of the fixed glass piece 58 and/or an outboard surface of the buffer between the second glass piece 14 and the fixed glass piece 58, as well as the outboard surface 50 of the second glass piece 14 are all oriented in a single plane when the second door 24 is in a closed position.

Figure 4A:
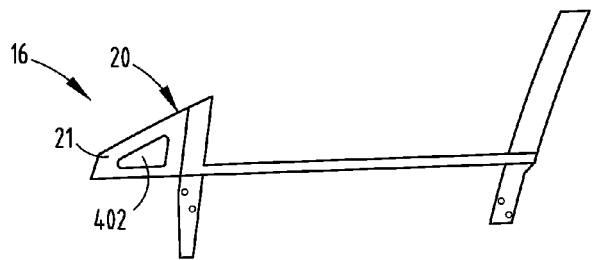
FIG. 4A is a side view of the daylight opening module without a top component.
Figure 4B:
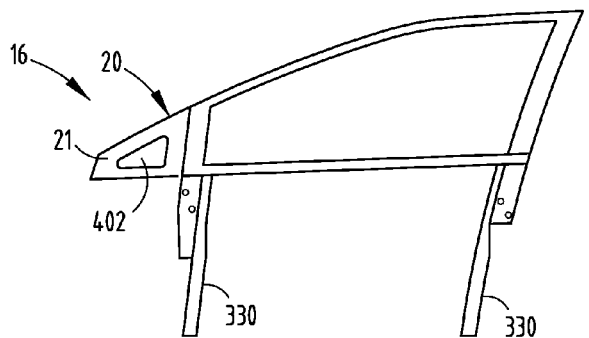
FIG. 4B is a side view of the daylight opening module having retaining structures that extend below a belt line of the automobile door.
Figure 5:
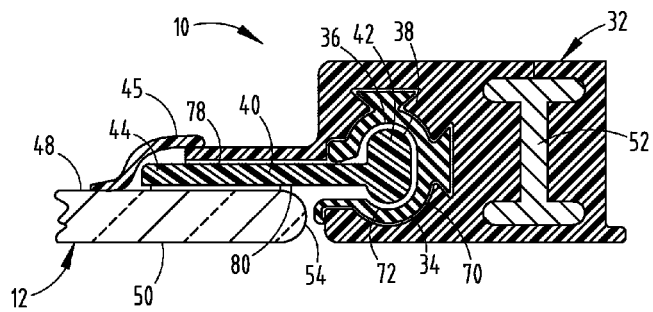
FIG. 5 is a top cross-sectional view taken through line V-V of FIG. 2A illustrating a glass window retaining structure.
Figure 6:
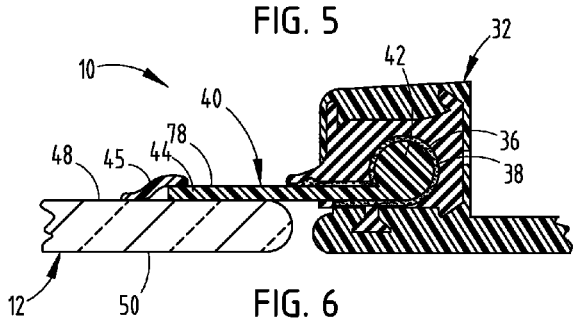
FIG. 6 is a top cross-sectional view of the glass window retaining structure, according to another embodiment.

Referring to FIGS. 5 and 6, the illustrated glass guiding and stabilization system 10 comprises an arrangement having the appliqué 32 disposed between the first glass piece 12 and the second glass piece 14. Although referred to as the appliqué 32, this component is more generally a retaining structure 32 that may be made of a number of materials, including but not limited to metal, plastic or an acrylic. The retaining structure 32 is part of a larger component that is generally described as the daylight opening module 16 for retaining components, which are described in detail below, that provide guidance and stability for movement of the glass pieces 12, 14, 58. The daylight opening module 16 may take on various embodiments (FIGS. 4, 4A, 4B, 9 and 9A) depending on the application of use, thereby providing design and manufacturing flexibility. Embodiments shown without a top component (FIGS. 4A and 9A) may be particularly useful for convertibles. The daylight opening module 16 may comprise a single molded or extruded piece or a plurality of components and is operably connected to the first or second door 22, 24. For a daylight opening module 16 having a plurality of components, the joining of the components may be accomplished by welding, including sonic welding, mechanically fastening, chemically bonding, an adhesive, and tape, among other assembly methods. The assembly method of the daylight opening module 16 to the first or second door 22, 24 will be described in detail below.

The illustrated retaining structure 32 is oriented in a substantially vertical direction and corresponds substantially with the rear edge 54 of the first glass piece 12. The retaining structure 32 includes a channel 34 that extends in a substantially vertical direction within the retaining structure 32. The channel 34 may be of any number of geometric configurations and within the channel 34 is disposed a seal 36. The disposal of the seal 36 within the channel 34 may be accomplished by an adhesive or mechanically fastening the seal 36 therein. The seal 36 may be extruded or molded (including multi-shot molding process) and may be made of various materials including, but not limited to thermoplastic vulcanizates (TPVs), thermoplastic polyurethanes (TPUs), thermoplastic polyolefins (TPOs), ethylene propylene diene monomers (EPDMs), etc. The seal 36 comprises an outer surface 70 that is at least partially in contact with the retaining structure channel 34 and also an inner surface 72. The cavity formed by the inner surface 72 may take on any number of geometries and most, if not all, of the inner surface 72 is coated with a low friction substance 38, according to one embodiment. The low friction substance 38 may be approximately 50 micrometers (μm) of Tokiwa or a similar coating having a low friction coefficient, but it is conceivable that the substance 38 thickness could range from approximately 4 micrometers (μm) to approximately 6 millimeters (mm).

Figure 7:
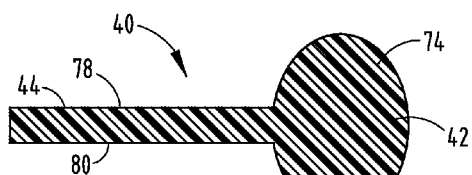
FIG. 7 is a cross-sectional view taken through an oval-shaped glass guide, according to another embodiment.
Figure 8:
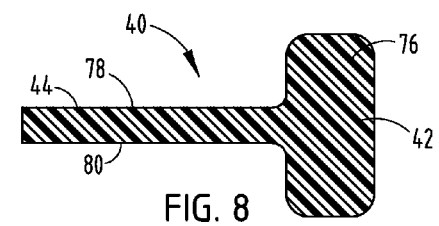
FIG. 8 is a cross-sectional view taken through a rectangular-shaped glass guide, according to a further embodiment.
Figure 8A:
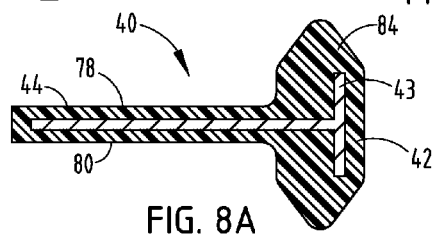
FIG. 8A is a cross-sectional view taken through a tapered glass guide, according to a further embodiment.

A glass guide 40 is comprised of a body portion 44 and an engagement section 42. The engagement section 42 is disposed within the seal 36, and more specifically within the coating 38 on the inner surface 72 of the seal 36. The engagement section 42 is formed of a geometry corresponding to the geometry of the cavity formed by the inner surface 72 of the seal 36. As noted above, these corresponding geometries may be any number of geometries including, but not limited to, an oval shape 74 (FIG. 7) or a rectangular shape 76 (FIG. 8) or a tapered shape 84 (FIG. 8A). The glass guide 40 is typically a plastic material, but it is conceivable that several other materials may be suitable. Rather than constructing the entire glass guide 40 of a single material, such as plastic, the glass guide 40 may optionally include a rigid insert 43, such as metal, to provide additional structural integrity. Extending away from the engagement section 42 of the glass guide 40 is the body portion 44. The body portion 44 extends in a plane substantially parallel to the inboard surface 48 of the first glass piece 12. The body portion 44 of the glass guide 40 includes an inboard surface 78 and outboard surface 80. At least part of the outboard surface 80 includes a bonding adhesive as well as an adhesion primer to ensure proper adhesion that securely engages the body portion 44 of the glass guide 42 to the inboard surface 48 of the first glass piece 12. This secure engagement allows the glass guide 40 to travel in a substantially vertical direction with the first glass piece 12 as the first glass piece 12 moves up or down in a substantially vertical direction. During such movement, the engagement section 42 of the glass guide 40 travels smoothly within the seal 36 and does not chuck or bind as a result of suitable controlled tolerances, and the presence of the low friction coating or other known material 38 within the inner surface 72 of the seal 36. One or more sealing lips 45 (FIGS. 5, 6, 10 and 11) may be employed to ensure continuous sealing between the inboard surface 48 of the glass piece 12 and the glass guide 40, as well as optionally the retaining structure 32.

Additionally, to minimize or eliminate the appearance of the glass guide 40 and any associated adhesive, when looking at the vehicle from the exterior, a frit material is included along the inboard surface 48 of the first glass piece 12 where the body portion 44 of the glass guide 40 is present. The retaining structure 32 may optionally include a rigidifying insert 52 to increase the structural integrity of the retaining structure 32. This rigidifying structure 52 may be of various shapes, such as an I-beam shape, as illustrated in one embodiment, and may be of various materials, including metal according to other embodiments.

Figure 9:
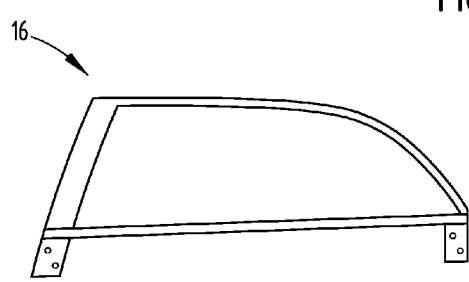
FIG. 9 is a side view of a rear daylight opening module that may be used in a vehicle rear door.
Figure 9A:
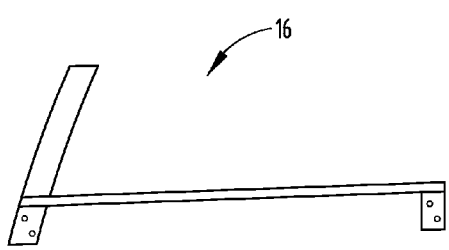
FIG. 9A is a side view of the rear daylight opening module without a top component.
Figure 10:
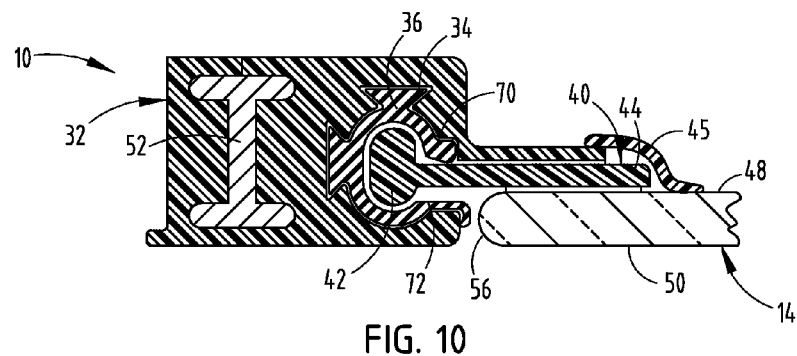
FIG. 10 is a top cross-sectional view taken through line X-X of FIG. 2, illustrating a rear glass window retaining structure.
Figure 11:
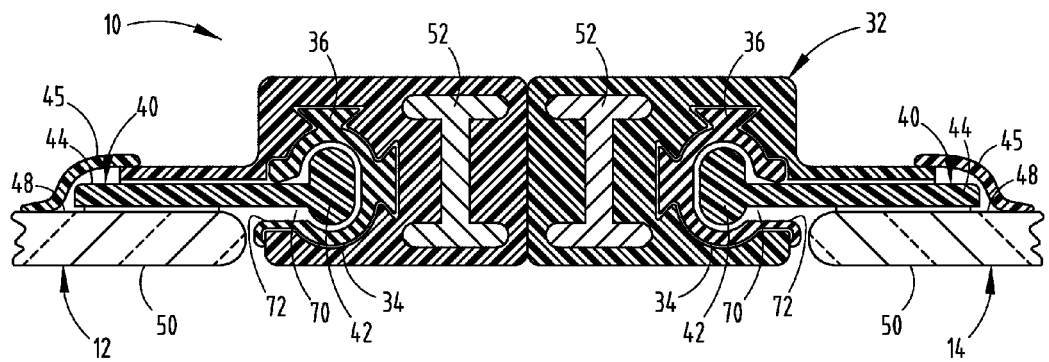
FIG. 11 is a top cross-sectional view taken through line XI-XI of FIG. 3, illustrating the front and rear glass window retaining structures.

The previously described retaining structure 32 was discussed in the context of associating with the rear edge 54 of the first glass piece 12. A similar retaining structure 32, as shown in FIGS. 9-11, may be present proximate any edge of either the first or second glass piece 12, 14. Specifically, such a retaining structure 32 may be present at the front edge 56 of the second glass piece 14, the rear edge 54 of the second glass piece 14, and/or the front edge 56 of the first glass piece 12, in addition to the previously described position of the rear edge 54 of the first glass piece 12. The key distinction between the various positioning of the retaining structure 32 pertains to orientation of the glass guide 40. When positioned at a rear edge 54, the glass guide 40 will extend away from the seal 36 towards the front of the vehicle, whereas when positioned at a front edge 56 of the first or second glass piece 12, 14, the glass guide 40 will extend away from the seal 36 towards the rear of the vehicle.

Figure 12:
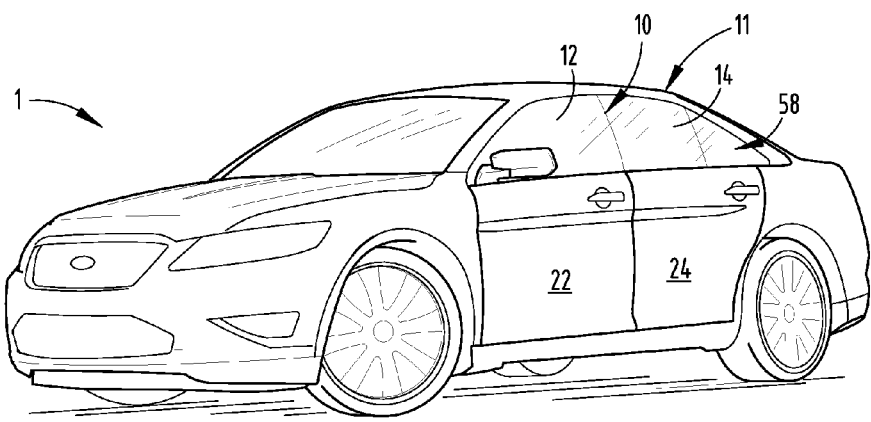
FIG. 12 is a front perspective view of a second embodiment of an automobile having a flush glass assembly.
Figure 13:
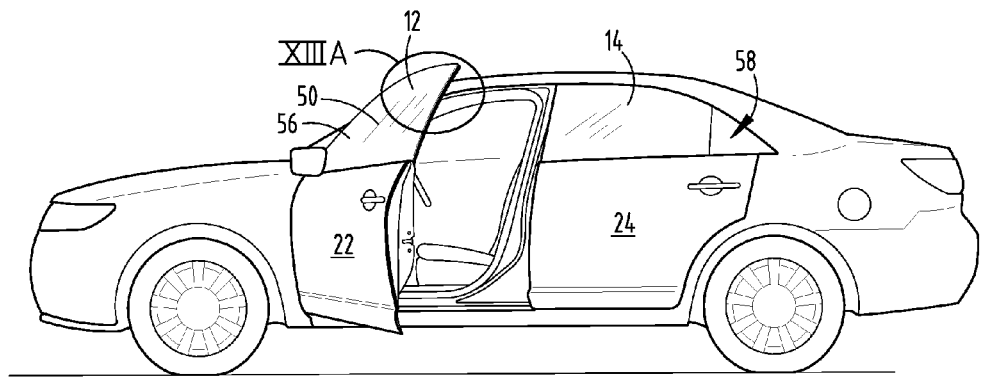
FIG. 13 is a side elevational view of the second embodiment of the automobile shown in FIG. 12 with a door in an open position.
Figure 13A:
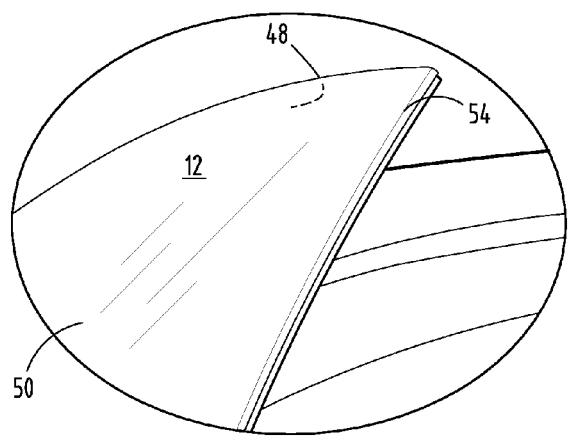
FIG. 13A is an enlarged view of section XIIIA of FIG. 13 illustrating a top and rear side of a glass window.
Figure 14:
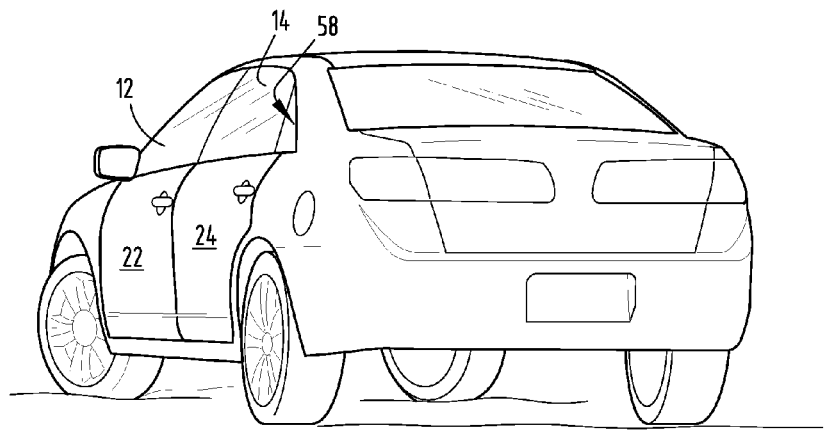
FIG. 14 is a rear perspective view of the automobile shown in FIG. 13.

In addition to one or more appliqués disposed between the first and second glass pieces 12, 14, the glass guiding and stabilization system 10 may be configured such that no structural object is disposed between the first and second glass pieces 12, 14, according to a second embodiment. Specifically, the rear edge 54 of the first glass piece 12 comes into contact with the front edge 56 of the second glass piece 14 as shown in FIGS. 12-14. In this embodiment, a first guide 100 is bonded to the inboard surface 48 of the first glass piece 12 proximate the rear edge 56 of the first glass piece 12. A second guide 102 is bonded to the inboard surface 48 of the second glass piece 14 proximate the front edge 56 of the second glass piece 14. The bonding substance is similar to that described in the previous embodiment. The guides 100, 102 slide within coated seals having a corresponding geometry to the seals 36, 102, as described in the previous embodiment.

Figure 15:
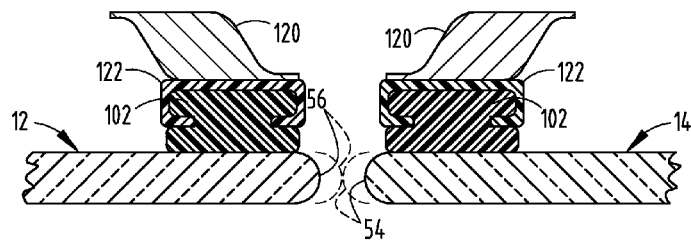
FIG. 15 is a top view of a glass window retaining structure for the flush glass assembly of the second embodiment of the automobile.

Referring to FIG. 15, in this embodiment each glass piece 12, 14 travels up and down in a substantially vertical direction between a raised and a lowered position, but this movement is not truly vertical. Instead, the first glass piece 12 moves slightly rearward, with respect to the vehicle, as the first glass piece 12 is moved from a lowered position to the raised position. Similarly, the second glass piece 14 moves slightly forward, with respect to the vehicle, as the second glass piece 14 is moved from a lowered position to the raised position. It is only when both glass pieces 12, 14 are in the fully raised position that the rear edge 56 of the first glass piece 12 is in contact with the front edge 54 of the second glass piece 14. It is also conceivable that only one of the glass pieces 12, 14 is moveable between a lowered and raised position, according to a further embodiment. The first and second glass pieces 12, 14 are bonded to guides 100, 102, respectively, in a similar fashion as that described above, with respect to the bonding of the glass pieces 12, 14 to glass guide 40. The guides 100, 102 slidably reside, at least in part, within channels 122 that are secured to the automobile body side metal 120. The securing of the channels 122 to the metal 120 may be achieved by welding, bolting, riveting, etc. These are merely a few illustrative examples. Additionally, the channels 122 may be secured to the aforementioned daylight opening module 16.

Figure 16:
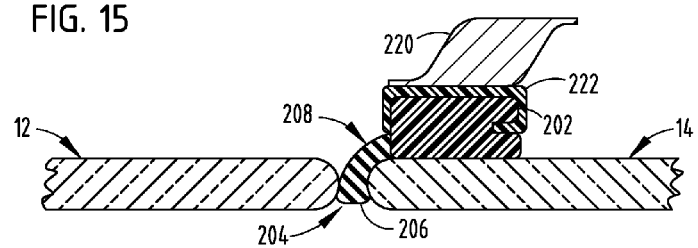
FIG. 16 is a sealing arrangement for sealing two flush glass windows, according to a first embodiment.
Figure 17:
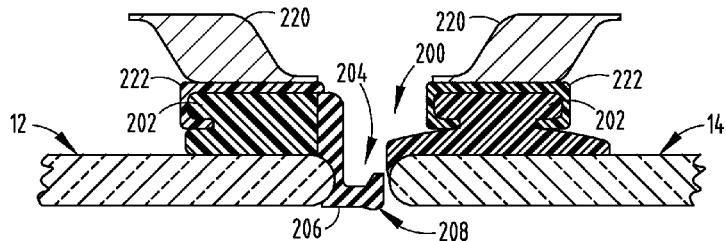
FIG. 17 is a sealing arrangement for sealing two flush glass windows, according to a second embodiment.
Figure 18:
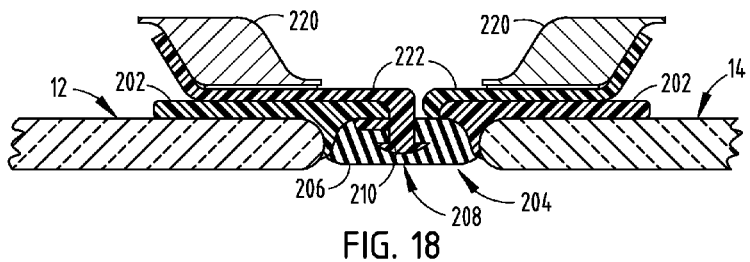
FIG. 18 is a sealing arrangement for sealing two flush glass windows, according to a third embodiment.

A third embodiment of the flush glass assembly 11 having the glass guiding and stabilization system 10 is shown in FIGS. 16-18 which does not include an appliqué 32 between the first and second glass pieces 12, 14, and instead merely has a flexible seal arrangement 200 disposed between the first and second glass pieces 12, 14. Additionally, and similar to previous embodiments, the first and second glass pieces 12, 14 are bonded to guides 202 that slidably reside, at least in part, within channels 222 that are secured to the automobile body side metal 220 or a form of the daylight opening module 16 in a manner previously described. The seal arrangement 200 comprises a seal component 208 that extends from the guide 202 discussed above. The seal 208 is typically an extension of the guide 202 and closes out a small gap 204 between the first and second glass pieces 12, 14, while also sealing the gap 204 to prevent debris and air from entering the interior of the vehicle. In any case, the seal 208 will have an outboard surface 206 that is substantially parallel to the single plane formed by the outboard surfaces 50 of the first and second glass pieces 12, 14. The seal 208 (FIG. 18) may optionally include a structural rigidifying insert 210, depending on the particular application.

Figure 18A:
FIG. 18A is a sealing arrangement, according to a fourth embodiment.
Figure 19:
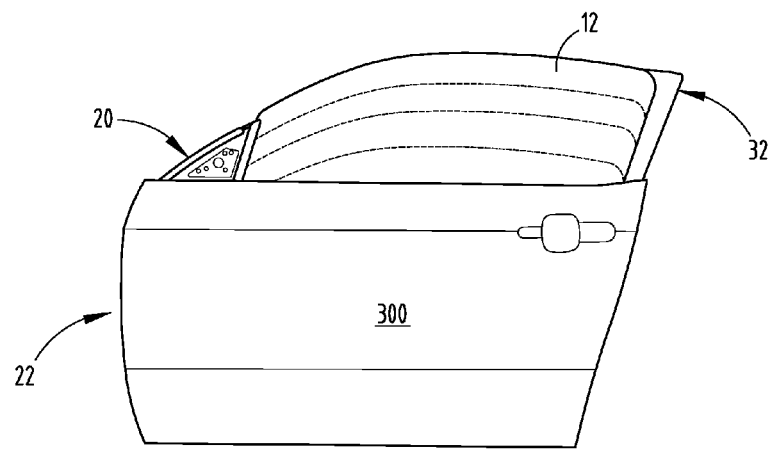
FIG. 19 is a side elevational view of a front door of the automobile having a lower door frame.
Figure 20:
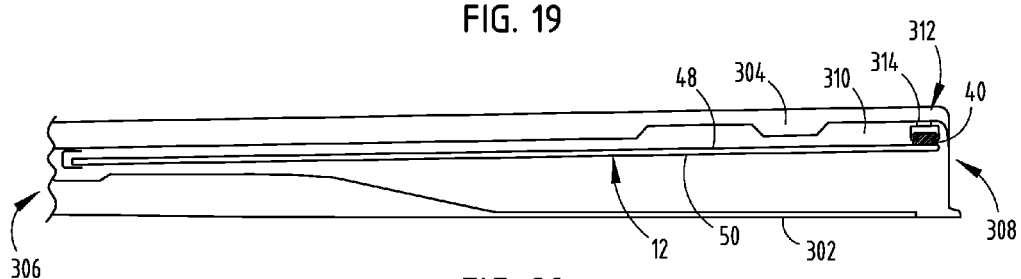
FIG. 20 is a top plan view of the lower door frame.
Figure 21:
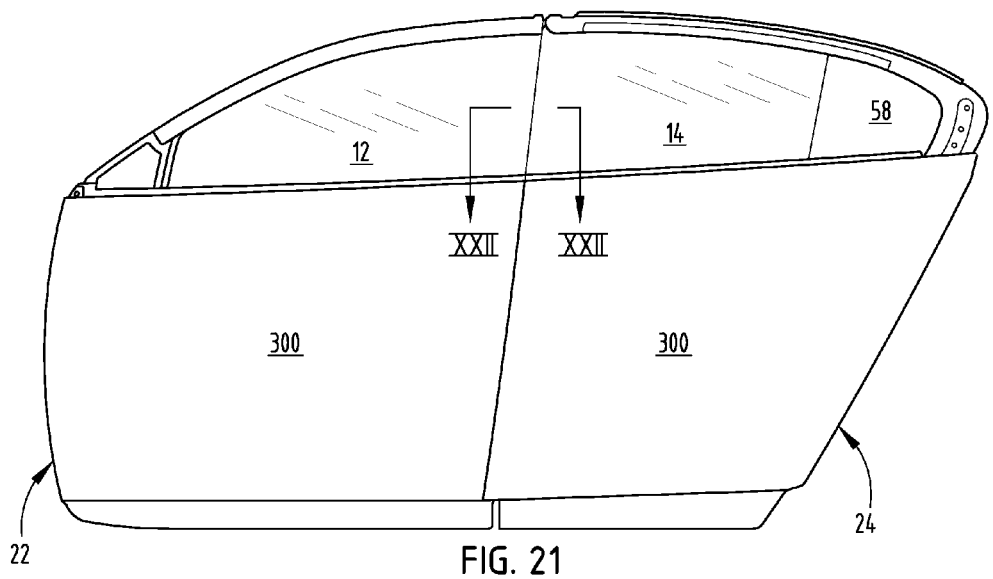
FIG. 21 is a side elevational view of the front and rear side doors.

Referring to FIG. 18A, a seal 208 is shown representing an embodiment having a buffer, such as an appliqué, between the first and second glass pieces 12, 14 above the belt line, described in detail previously. Based on the detailed disclosure provided above, structural components have been omitted to more clearly represent an alternate sealing arrangement that includes the seals 208 positioned at extreme edges of the first and second glass pieces 12, 14. The illustrated embodiment shows two seals 208 employed to close out the gap 204, but a single seal 208 may be mounted to the appliqué. Such an appliqué may include a flange that extends perpendicularly to the appliqué surface, in an inboard direction, having one or more locking features. The locking features function to engage gripping features present on the seal 208.

The first and second doors 22, 24 each comprise a lower door frame 300 as seen in FIGS. 19-23 that includes an outer panel 302 and an inner panel 304, with both the outer panel 302 and the inner panel 304 having a front edge 306 and a rear edge 308. The lower door frame 300 will be described generally, but it is noted that the lower door frame 300 may take on any number of configurations to accommodate various automobile models, including sedans, coupes, convertibles, trucks, SUVs, crossovers, etc. The specific model will dictate, in part, the details of the lower door structure 300 components, with respect to geometry, arrangement, location, etc.

A gap 310 is provided between the outer panel 302 and the inner panel 304 that is large enough to house the first or second glass piece 12, 14, respectively. As discussed above, the glass guide 40 is operably connected to the inboard surface 48 of the first or second glass piece 12, 14, with bonding being one example of such an operable connection. Also disposed between the outer panel 302 and the inner panel 304 is at least one retaining bracket 312 that comprises a channel 314 which is configured similar to the retaining structure 32 described above. The retaining bracket 312 and associated components may simply be an extension of the retaining structure 32 that was previously described in a configuration above the belt line of the door 22, 24. Such a configuration would allow the retaining bracket 312 to be assembled as part of the daylight opening module 16. It is also conceivable that the retaining bracket 312 and/or the retaining structure 32 may be comprised of multiple pieces that are placed in spaced alignment or in a direct abutting alignment. The retaining bracket 312 may be secured to the lower door frame 300 at various locations, including the outer panel 302, the inner panel 304, the front edge 306, and/or the rear edge 308. The retaining bracket may be secured to the lower door frame 300 by welding, riveting, bolting, or by employing other mechanical fasteners. Additionally, as described above, the retaining bracket 312 may be formed as part of the daylight opening module 16 that includes extensions 330 (FIG. 4B) that descend downwardly into the lower door frame 300. The extent of the descension will depending on numerous factors, including the type of door, type of glass, whether the glass is moveable or fixed, etc.

Figure 22:
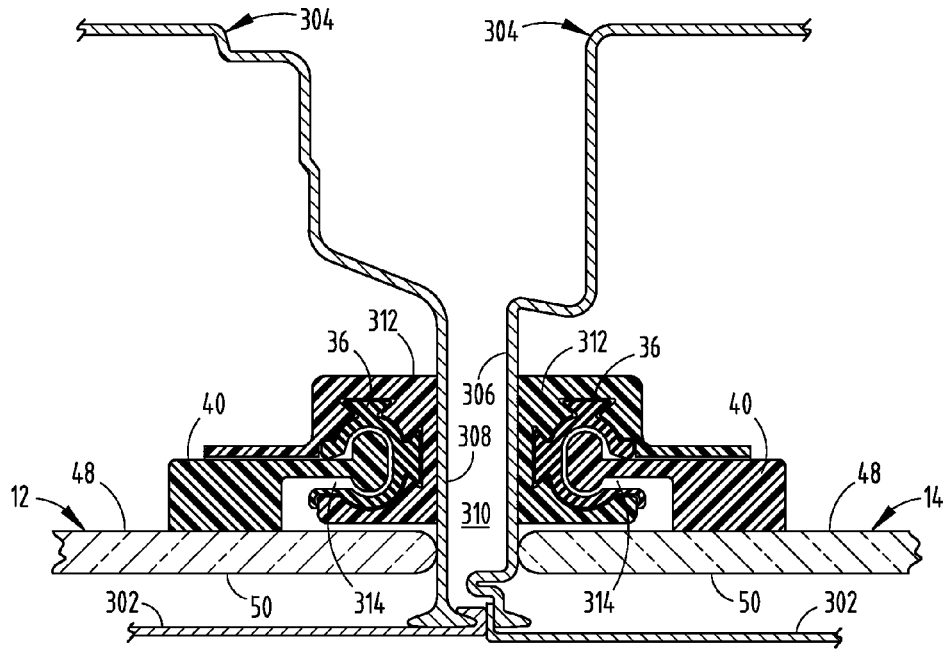
FIG. 22 is a top cross-sectional view taken through lines XXII-XXII of FIG. 21 illustrating the glass window retaining structure disposed within the lower door frame, according to one embodiment.
Figure 22A:
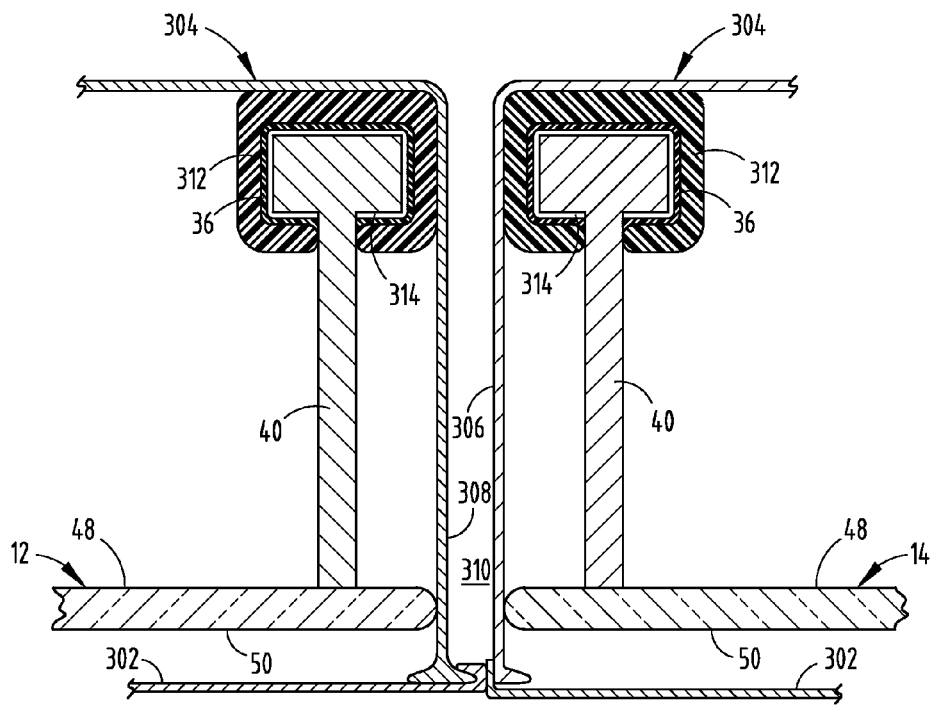
FIG. 22A is a top cross-sectional view of the glass window retaining structure disposed within the lower door frame, according to another embodiment.
Figure 23:
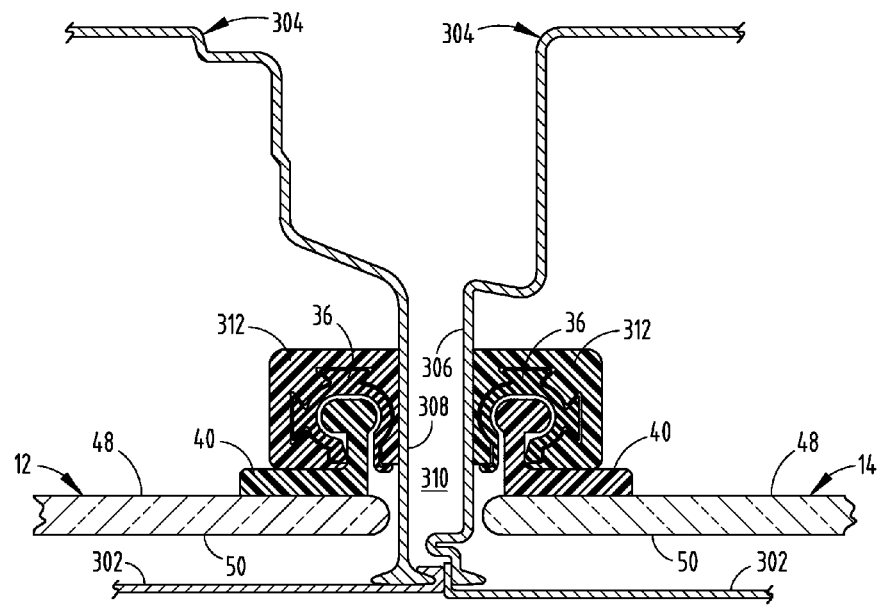
FIG. 23 is a top cross-sectional view of the glass window retaining structure disposed within the lower door frame, according to another embodiment.

As is the case with the retaining structure 32, the channel 314 is sealed and is configured to slideably retain the glass guide 40. In the case of the first door 22, and more specifically the lower door frame 300 of the first door 22, the retaining bracket 312 is located proximate the rear edge 54 or the front edge 56 of the glass piece 12. There may also be a plurality of retaining brackets 312, for example, having one retaining bracket 312 at each of the rear edge 308 and the front edge 306. Additionally, as mentioned above, the retaining brackets 312 may be positioned at various locations within the lower door frame 300, such as the front and rear edges 306, 308 of the lower door frame 300 (FIG. 22) or alternatively the inner panel (FIG. 22A) of the lower door frame 300. The latter configuration may be particularly advantageous in an application that requires the glass pieces 12, 14, and/or 58 to be particularly close in proximity to one another, such as where the vehicle lacks an appliqué or other large buffer between glass pieces.

The positioning of the retaining brackets 312 is dependent upon the desired position of the glass pieces 12, 14. The glass guide 40 may be bonded to the glass pieces 12, 14 at any position to provide adjustability to the glass pieces 12, 14 positioning.

Figure 25:
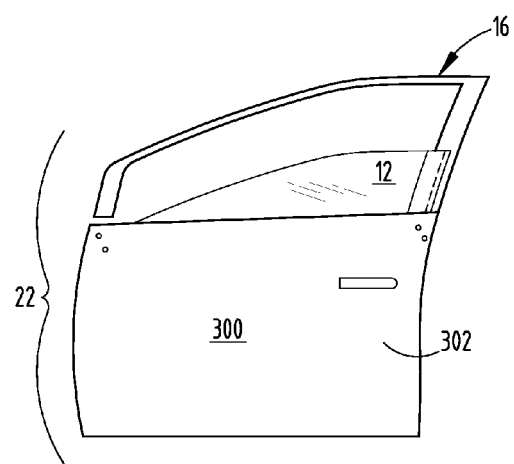
FIG. 25 is a side elevational view of the lower door frame and the daylight opening module.

Referring to FIG. 25, a method for assembling the overall glass guiding and stabilization assembly 11, as well as the first door 22, is further illustrated. As described above, the upper door frame comprises a daylight opening module 16 that may be comprised of one or more components. These components may include exterior trim components including, but not limited to, belts, belt seals, exterior trim, appliqués, badging a header molding, mirror mounts, and a mirror.

Additionally, the daylight opening module 16 may include interior trim components including, but not limited to, garnish molding, an inner belt, and a mirror sail cover. It is conceivable that some or all of these components may be preassembled prior to installation of the door 22 and/or 24 on the automobile. Irrespective of which components make up the daylight opening module 16, by preassembling some or all of the components, installation of the daylight opening module 16 is facilitated in an efficient manner with superior fit and finish improvements.

Figure 24:
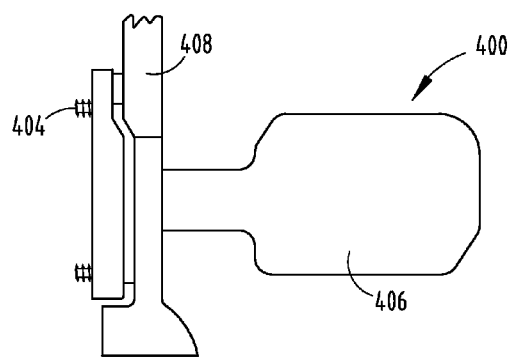
FIG. 24 is a front elevational view of a side mirror assembled to the daylight opening module.

The daylight opening module 16 may simply be mounted over the first glass piece 12, the second glass piece 14, and/or the quarter glass piece 58. At least one portion of the daylight opening module 16 extends below the belt shelf and is mechanically fastened to the lower door frame 300 inner panel 304 and/or an extension of the outer panel 302. The daylight opening module 16 may be configured to include a side view mirror assembly as shown in FIG. 24, according to one embodiment. In the event the daylight opening module 16 does includes a mirror assembly 400 (FIG. 24), the mirror assembly 400 may simply be installed prior to or during daylight opening module 16 installation. It is also conceivable that the mirror assembly 400 is not a component of the daylight opening module 16 and the mirror assembly 400 has been attached to the door metal prior to installation of the daylight opening module 16. This attachment may be made by bolts, screws, clips, or any other suitable mechanical fastener 404. In this case, the daylight opening module 16 includes an aperture 402 larger in area than that of the mirror 400 and is simply fit over the previously installed mirror assembly 400. The mirror assembly 400 may include several components, including a mirror head 406 and a mirror sail mount 408. Both the mirror head 406 and mirror sail mount 408 may be customized to various geometries to meet aerodynamic requirements and provide aesthetic design flexibility. The mirror assembly 400 is serviceable, while being integrated with the automobile body or the daylight opening module 16.

It is important to note the manufacturing and assembly flexibility provided by the glass guiding and stabilization system 10. As previously described, the system 10 components may be assembled individually or come in as an integrated daylight opening module 16. Flexibility is provided by allowing the glass to be installed prior to module 16 installation or subsequent to module 16 installation. In the case of the glass being installed prior to module 16 installation, the module 16 may simply slide onto the glass guides 40 prior to moving the module 16 downward to attach the module to the lower door frame 300. Conversely, installing the glass after installation of the module 16 allows the glass to simply "drop-in" to the flush glass assembly 11. The glass guides 40 may already be bonded to the glass and lowered into the channel 34 of the retaining structure 32, and more specifically within the seal 36. Alternatively, it is conceivable that the glass guide 40 is bonded to the glass during or after dropping in the glass.

The flush glass assembly 11 advantageously provides for a "flush" glass window arrangement for a vehicle, thereby decreasing wind noise heard by a vehicle occupant, while adequately sealing proximate glass window edges to prevent debris from entering the passenger area. Additionally, the glass guiding and stabilization system improves vehicle assembly methods by providing enhanced flexibility, while also alleviating assembly issues commonly associated with installation of doors, glass windows, and other associated components. Based on the aforementioned flexibility, all or a portion of the described invention may be employed in various other automobile applications, such as a moonroof assembly.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An automobile flush glass assembly comprising:
a moveable glass piece having an inboard surface, an outboard surface, a front edge and a rear edge, wherein the glass piece front edge is adjacent a first object and the rear edge is adjacent a second object, and the outboard surface of the glass piece is in a single plane with the first and second objects when the glass piece is in a closed position;
a first glass guide operably connected to the inboard surface of the glass piece proximate the front edge;
a second glass guide operably connected to the inboard surface of the glass piece proximate the rear edge; and
a retaining structure having a channel configured to slideably retain the second glass guide and a seal disposed within the channel, wherein the second glass guide comprises an engagement section having an enlarged portion that extends entirely beyond the rear edge of the moveable glass piece and is disposed in the channel, wherein the seal substantially surrounds the enlarged portion of the engagement section and a low friction surface is on the seal to allow the engagement section to slide within the channel, wherein the rear edge of the glass piece defines a vertical plane and the glass piece is located on a first side of the vertical plane and the entirety of the enlarged portion of the engagement section is located on a second opposite side of the vertical plane, and wherein a sealing lip is fixed on the inboard surface of the glass piece, wherein the sealing lip is configured to sealingly engage at least a portion of the second glass guide or the retaining structure.

2. The automobile flush glass assembly of claim 1, wherein the operable connection of each of the first and second glass guides to the inboard surface of the moveable glass piece is a bonded portion, and wherein the assembly further comprises a frit material located on the inboard surface of the moveable glass piece and proximate the bonded portion.

3. The automobile flush glass assembly of claim 1, wherein each of the first and second glass guides comprises a plastic material.

4. The automobile flush glass assembly of claim 1, wherein the first and second glass guides each include an engagement section, and wherein the enlarged portion of the engagement section of the second glass guide includes a shape conforming to a shape of the seal within the channel of the retaining structure.

5. The automobile flush glass assembly of claim 1, wherein the seal includes a low friction coating comprising a thickness of approximately 4 micrometers (μm) to approximately 6 millimeters (mm).

6. The automobile flush glass assembly of claim 1, wherein the seal is mechanically fastened to the retaining structure to securely fit within the channel of the retaining structure.

7. The automobile flush glass assembly of claim 1, wherein the retaining structure is an appliqué made of an acrylic material.

8. The automobile flush glass assembly of claim 1, wherein the retaining structure comprises a sheet metal arrangement.

9. A flush glass assembly for an automobile comprising:
a glass piece located proximate a door of the automobile, wherein the glass piece comprises an outboard surface, an inboard surface, a front edge and a rear edge, and wherein the door is rotatable between an opened position and a closed position;
a glass guide operably connected to the inboard surface of the glass piece and comprising an engagement section having an enlarged portion, wherein the glass guide is operably connected to the inboard surface of the glass piece proximate the rear edge and the enlarged portion of the engagement section extends entirely beyond the rear edge of the glass piece;
a retaining structure having a channel that includes a seal substantially surrounding the enlarged portion of the engagement section and a low friction coating, wherein the retaining structure is mechanically fastened to an inner panel of the door, wherein the seal has a shape conforming to a shape of the enlarged portion of the engagement section; and
wherein the glass piece front edge is adjacent a first object and the rear edge is adjacent a second object and the outboard surface of the glass piece is in a single plane with the first and second objects when the door is in the closed position, wherein the rear edge of the glass piece defines a vertical plane and the glass piece is located on a first side of the vertical plane and an entirety of the enlarged portion of the engagement section is located on a second opposite side of the vertical plane, and wherein a sealing lip is fixed on the inboard surface of the glass piece, wherein the sealing lip is configured to sealingly engage at least a portion of the glass guide or the retaining structure.

10. The flush glass assembly for an automobile of claim 9, wherein the operable connection of the glass guide to the inboard surface of the glass piece is a bonded portion.

11. The flush glass assembly for an automobile of claim 9, wherein the glass guide is a plastic material.

12. The flush glass assembly for an automobile of claim 9, wherein the seal of the channel and the low friction coating are configured to slideably retain the glass guide and the coating has a thickness of approximately 4 micrometers (μm) to approximately 6 millimeters (mm).

13. The flush glass assembly for an automobile of claim 9, wherein the seal is mechanically fastened to the retaining structure to securely fit within the channel of the retaining structure.

14. The flush glass assembly for an automobile of claim 9, wherein the retaining structure is an appliqué made of an acrylic material.

15. The flush glass assembly for an automobile of claim 9, wherein the retaining structure comprises a sheet metal arrangement.

16. A flush glass assembly for an automobile comprising:
a moveable glass piece having outboard and inboard surfaces, wherein the outboard surface is flush with a first object adjacent a front edge of the glass piece and is flush with a second object adjacent a rear edge of the glass piece when the glass piece is in a closed position;
a glass guide operably connected to the inboard surface of the moveable glass piece and having an engagement section having an enlarged portion; and
an appliqué comprising:
a channel including a seal having a low friction coating configured to slideably retain the enlarged portion of the engagement section rearward of the glass piece within the appliqué; and
a rigid insert for structural strengthening of the appliqué, wherein the rear edge of the glass piece defines a vertical plane and the glass piece is located on a first side of the vertical plane and an entirety of the enlarged portion of the engagement section is located on a second opposite side of the vertical plane, and wherein a sealing lip is fixed on the inboard surface of the glass piece, wherein the sealing lip is configured to sealingly engage at least a portion of the glass guide or the appliqué.

17. The flush glass assembly for an automobile of claim 16, wherein the enlarged portion of the engagement section extends away from the rear edge and is closer to the appliqué than the rear edge.

18. The flush glass assembly for an automobile of claim 16, wherein the seal has a shape conforming to a shape of the engagement section and is mechanically fastened to the appliqué to securely fit within the channel of the appliqué.

* * * * *